(12) United States Patent
Gerard et al.

(10) Patent No.: US 10,470,609 B2
(45) Date of Patent: Nov. 12, 2019

(54) STEAMING ACCESSORY COMPRISING A RECEPTACLE FOR COLLECTING CONDENSATES DESIGNED TO REST ON A MIXING BOWL OF A HOUSEHOLD APPLIANCE

(71) Applicant: SEB S.A., Ecully (FR)

(72) Inventors: Emmanuel Gerard, Couterne (FR);
Johan Nespoux, Chalons-du-Maine (FR)

(73) Assignee: SEB S.A., Ecully (FR)

( * ) Notice: Subject to any disclaimer, the term of this patent is extended or adjusted under 35 U.S.C. 154(b) by 253 days.

(21) Appl. No.: 15/140,859

(22) Filed: Apr. 28, 2016

(65) Prior Publication Data
US 2016/0316964 A1    Nov. 3, 2016

(30) Foreign Application Priority Data
Apr. 28, 2015   (FR) ..................... 15 53835

(51) Int. Cl.
| | |
|---|---|
| A47J 36/38 | (2006.01) |
| A47J 43/07 | (2006.01) |
| A47J 27/00 | (2006.01) |
| A47J 27/04 | (2006.01) |
| A47J 43/046 | (2006.01) |

(52) U.S. Cl.
CPC ............. *A47J 36/38* (2013.01); *A47J 27/004* (2013.01); *A47J 27/04* (2013.01); *A47J 43/046* (2013.01); *A47J 43/0716* (2013.01)

(58) Field of Classification Search
CPC ........ A47J 27/004; A47J 36/38; A47J 43/046; A47J 43/0716

USPC ......... 99/331, 348, 413, 415, 337, 403, 417, 99/418, 446
See application file for complete search history.

(56) References Cited

U.S. PATENT DOCUMENTS

| | | | | |
|---|---|---|---|---|
| 5,189,947 A * | 3/1993 | Yim | ................. | A47J 27/04 |
| | | | | 126/369 |
| 5,299,553 A * | 4/1994 | Giebel | ............... | A47J 37/0786 |
| | | | | 126/242 |
| 6,840,159 B1 * | 1/2005 | Li | ............... | A47J 27/05 |
| | | | | 99/337 |

(Continued)

FOREIGN PATENT DOCUMENTS

| | | |
|---|---|---|
| DE | 102012004336 A1 | 9/2013 |
| EP | 2042060 A1 | 4/2009 |
| WO | 2013/131731 A1 | 9/2013 |

*Primary Examiner* — Dana Ross
*Assistant Examiner* — Joe E Mills, Jr.
(74) *Attorney, Agent, or Firm* — The Webb Law Firm

(57) ABSTRACT

Steaming accessory (4) including a receptacle (5) for collecting condensates designed to rest on a mixing bowl of a household appliance having a means of heating the contents of the mixing bowl, the receptacle (5) having a cavity (50) for collecting condensates and two gripping handles (52). The cavity (50) having a bottom with a protruding shaft (53) equipped with a central orifice allowing steam to pass through the accessory (4) also having at least one basket (6) for cooking food that is positioned on the receptacle (5), in which the shaft (53) includes, near its upper end, an annular wall extending around the central orifice and crosswise to the shaft (53), and in that the shaft (53) includes a deflecting wall that stands taller than the level of the annular wall.

10 Claims, 5 Drawing Sheets

(56) References Cited

U.S. PATENT DOCUMENTS

2015/0201788 A1* 7/2015 Douma .................. A47J 27/04
99/330

* cited by examiner

STEAMING ACCESSORY COMPRISING A RECEPTACLE FOR COLLECTING CONDENSATES DESIGNED TO REST ON A MIXING BOWL OF A HOUSEHOLD APPLIANCE

CROSS-REFERENCE TO RELATED APPLICATION

This application claims priority to French Patent Application No. 1553835 filed Apr. 28, 2015, the disclosure of which is hereby incorporated in its entirety by reference.

BACKGROUND OF THE INVENTION

This invention pertains to the general technical field of steaming accessories comprising a receptacle for collecting condensates designed to rest on a mixing bowl of a household cooking appliance comprising a means of heating the contents of the mixing bowl, and pertains more particularly to an accessory in which the receptacle has a cavity for collecting condensates and two gripping handles arranged symmetrically on either side of the cavity, said cavity having a bottom comprising a protruding shaft with a central orifice allowing steam to pass through.

DESCRIPTION OF RELATED ART

There already exists, in patent application EP 2 042 060, a cooking appliance comprising a heating container and a steaming accessory comprising a receptacle for collecting condensates designed to rest on the mixing bowl and a basket for cooking food that is positioned on the receptacle. In this document, the receptacle has a cavity for collecting condensates and two gripping handles arranged symmetrically on either side of the cavity. The cavity has a protruding shaft that allows steam to pass from the mixing bowl to the basket for cooking food, the condensates forming as the steam cools in the basket and falling back into the cavity of the receptacle due to gravity, thereby preventing the condensates from falling into the mixing bowl.

However, handling such a receptacle equipped with a cavity for collecting condensates presents the disadvantage of being particularly difficult when cooking is complete, as the liquid collected in the cavity tends to move about, generating waves inside the cavity when the user grips the receptacle by the handles in order to remove it from the mixing bowl. The result is a significant risk of the liquid overflowing through the shaft while the receptacle is being handled. Such overflowing then results in a spillage of the liquid, which can come into contact with the user, causing a significant burn risk if the user handles the receptacle as soon as cooking is complete, or in other words without waiting for the condensates to cool.

Consequently, one purpose of this invention is to remedy these disadvantages by offering a steaming accessory designed to equip a cooking appliance comprising a means of heating the contents of a mixing bowl in which the handling of the receptacle for collecting condensates is made safer, thereby improving usage ergonomics.

SUMMARY OF THE INVENTION

To this end, the invention pertains to a steaming accessory comprising a receptacle for collecting condensates designed to rest on a mixing bowl of a household appliance comprising a means of heating the contents of the mixing bowl, the receptacle having a cavity for collecting condensates and two gripping handles arranged symmetrically on either side of the cavity, said cavity having a bottom comprising a protruding shaft equipped with a central orifice allowing steam to pass through, the accessory also having at least one basket for cooking food that is positioned on the receptacle, characterized in that the shaft comprises, near its upper end, an annular wall extending around the central orifice and crosswise to the shaft, and in that the shaft comprises, facing each gripping handle, a deflecting wall that stands taller than the level of the annular wall.

Such a deflecting wall offers the advantage of reducing the amount of condensates moving to the central orifice of the shaft when the accessory is being carried. Indeed, the deflecting wall, which raises the height of the shaft edge facing the gripping handles of the receptacle, acts as a barrier that hinders the movement of the liquid.

In another characteristic of the invention, the shaft comprises a guard that covers, at least partially, the central orifice, the guard being supported by feet having, between them, radial openings to allow steam to pass through.

Such a characteristic makes it possible to achieve radial, even diffusion of the steam beneath the basket, in order to cook food more evenly.

In another characteristic of the invention, the deflecting wall extends along the perimeter of the shaft over an angular sector a of at least 130°.

Such a characteristic provides enough angular coverage of the deflecting wall to significantly limit the seepage of liquid inside the shaft, as the deflecting wall is advantageously centered on the longitudinal axis of the receptacle. The phrase "longitudinal axis of the receptacle" means the axis of the receptacle passing through the two gripping handles.

In another characteristic of the invention, the deflecting wall is arranged in the vertical extension of the cylindrical wall.

Such a characteristic provides complete visual integration of the deflecting wall on the shaft.

In another characteristic of the invention, the deflecting wall extends beyond the upper surface of the annular wall by at least 3 mm, and preferably on the order of 5 mm.

In another characteristic of the invention, between the deflecting walls, there is at least one resulting passageway allowing the water present on the upper surface of the annular wall to drain into the cavity.

Such a characteristic makes it possible to return to the cavity any liquid that manages to flow over the deflecting wall and run onto the annular wall along the deflecting wall.

In another characteristic of the invention, the passageway is arranged on an axis passing through the center of the shaft and extending perpendicular to a longitudinal axis passing through the two gripping handles.

In another characteristic of the invention, the shaft has two passageways arranged symmetrically between the deflecting walls.

Such a characteristic optimizes the return of the condensates to the cavity.

In another characteristic of the invention, the receptacle has at least one separating partition that extends crosswise in the cavity to block the movement of the liquid inside the cavity.

Such a characteristic reduces the amount of liquid moving from one longitudinal end of the cavity to the other, while the user is moving the receptacle.

In another characteristic of the invention, the gripping handles of the receptacle have a lower surface comprising a series of raised ribs, separated from one another by a thin layer of air.

Such a characteristic significantly decreases the temperature of the gripping handle in the area that comes into contact with the hand.

The invention also pertains to a steaming accessory comprising a receptacle for collecting condensates designed to rest on a mixing bowl of a household appliance comprising a means of heating the contents of the mixing bowl, the receptacle having at least one gripping handle, characterized in that the gripping handle has a lower surface comprising a series of raised ribs separated from one another by a thin layer of air.

The invention also pertains to a cooking appliance comprising a mixing bowl receiving a working tool that is spun by a motor and having a heating mechanism that can heat the contents of the mixing bowl, characterized in that it comprises a steaming accessory as described above.

BRIEF DESCRIPTION OF THE DRAWINGS

The purposes, aspects and advantages of this invention will be better understood through the description provided below of one particular method of implementing the invention, which is presented as a non-limiting example, in reference to the appended drawings, in which.

DETAILED DESCRIPTION OF THE INVENTION AND BEST MODE

Only the components necessary to understand the invention have been depicted. To make it easier to read the drawings, the same components bear the same reference numbers from one figure to another.

Figure 1:
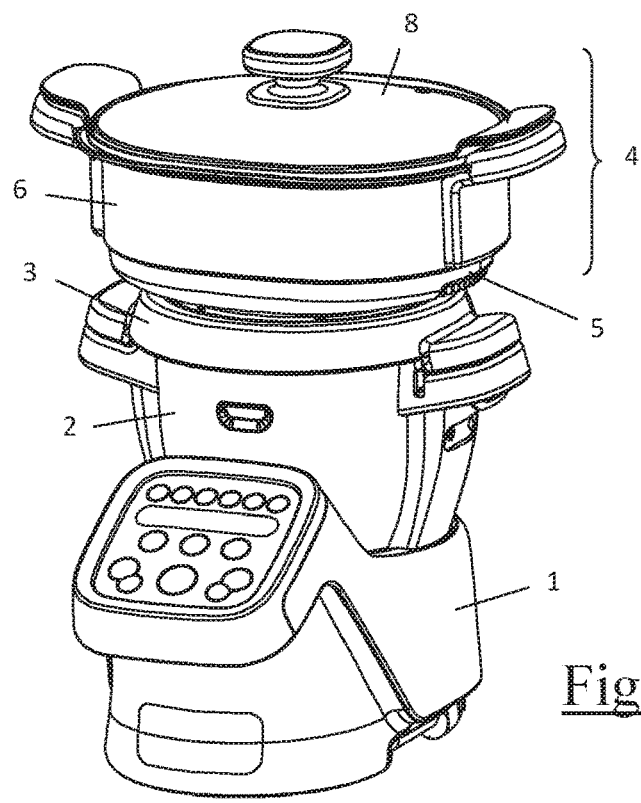
FIG. 1 is a perspective view of a cooking appliance equipped with a steaming accessory, in one particular method of implementing the invention.
Figure 2:
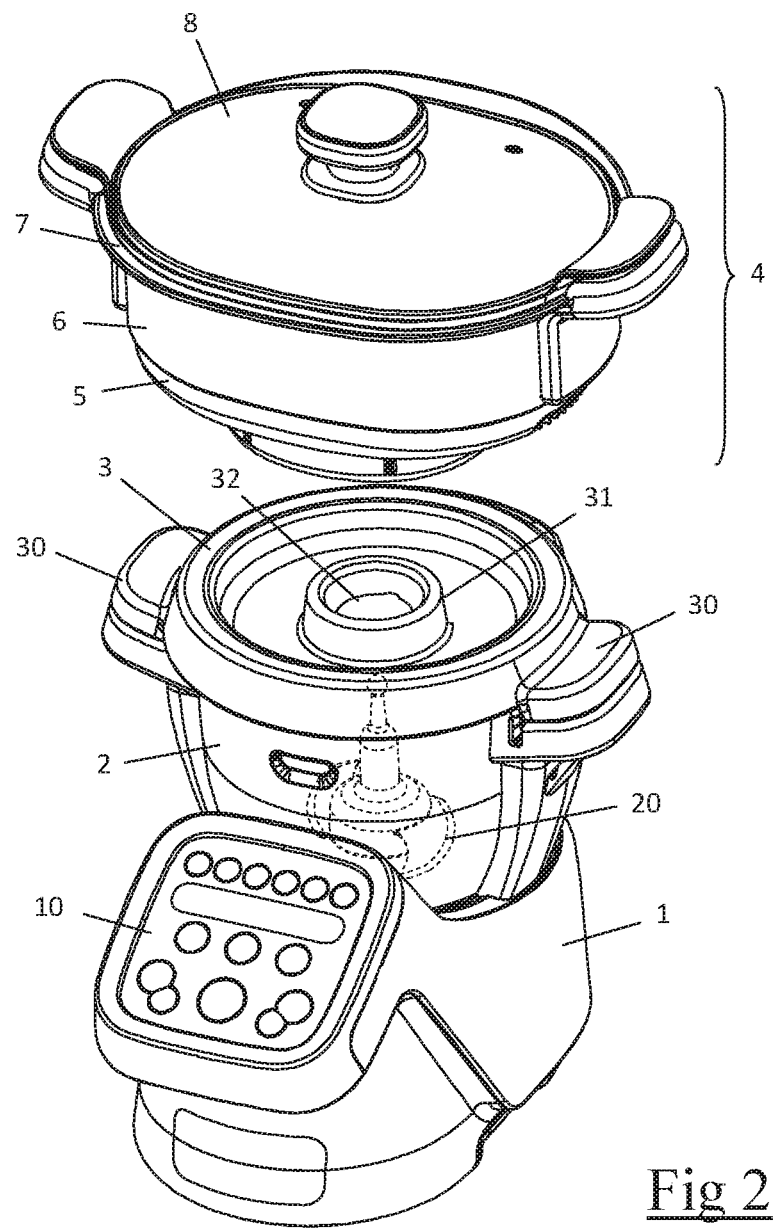
FIG. 2 is a perspective view of the appliance in FIG. 1 with the steaming accessory lifted away from the mixing bowl.

FIGS. 1 and 2 depict a cooking appliance comprising a casing (1) and a mixing bowl (2) resting in a removable manner on the casing (1), the mixing bowl (2) comprising a cylindrical shell equipped with an open upper end by which ingredients can be added to the mixing bowl (2), this open upper end being closed by a removable lid (3) that is generally round in shape, on which a steaming accessory (4) can be rested.

The casing (1), described in greater detail in patent application FR2998773 filed by the applicant, encloses, in the conventional manner, an electric motor, not depicted in the drawings, that spins a working tool (20) inside the mixing bowl (2) and comprises a heating element, not depicted, that can heat the contents of the mixing bowl (2).

The heating element and the motor are controlled, in the conventional manner, by an electronic card arranged beneath a control panel (10) present on the casing (1), said electronic card receiving the temperature value measured by a temperature sensor and regulating the power supply to the heating element so as to bring the contents of the mixing bowl (2) to a set temperature.

As can be seen in FIG. 2, the lid (3) is equipped with two gripping handles (30) arranged opposite one another and comprises, at its center, a protruding ring (31) with a central opening (32) leading directly to the interior of the mixing bowl (2), the opening (32) also forming a recess to accommodate a measuring cap, not depicted in the drawings, when the accessory (4) is not in use.

Figure 3:
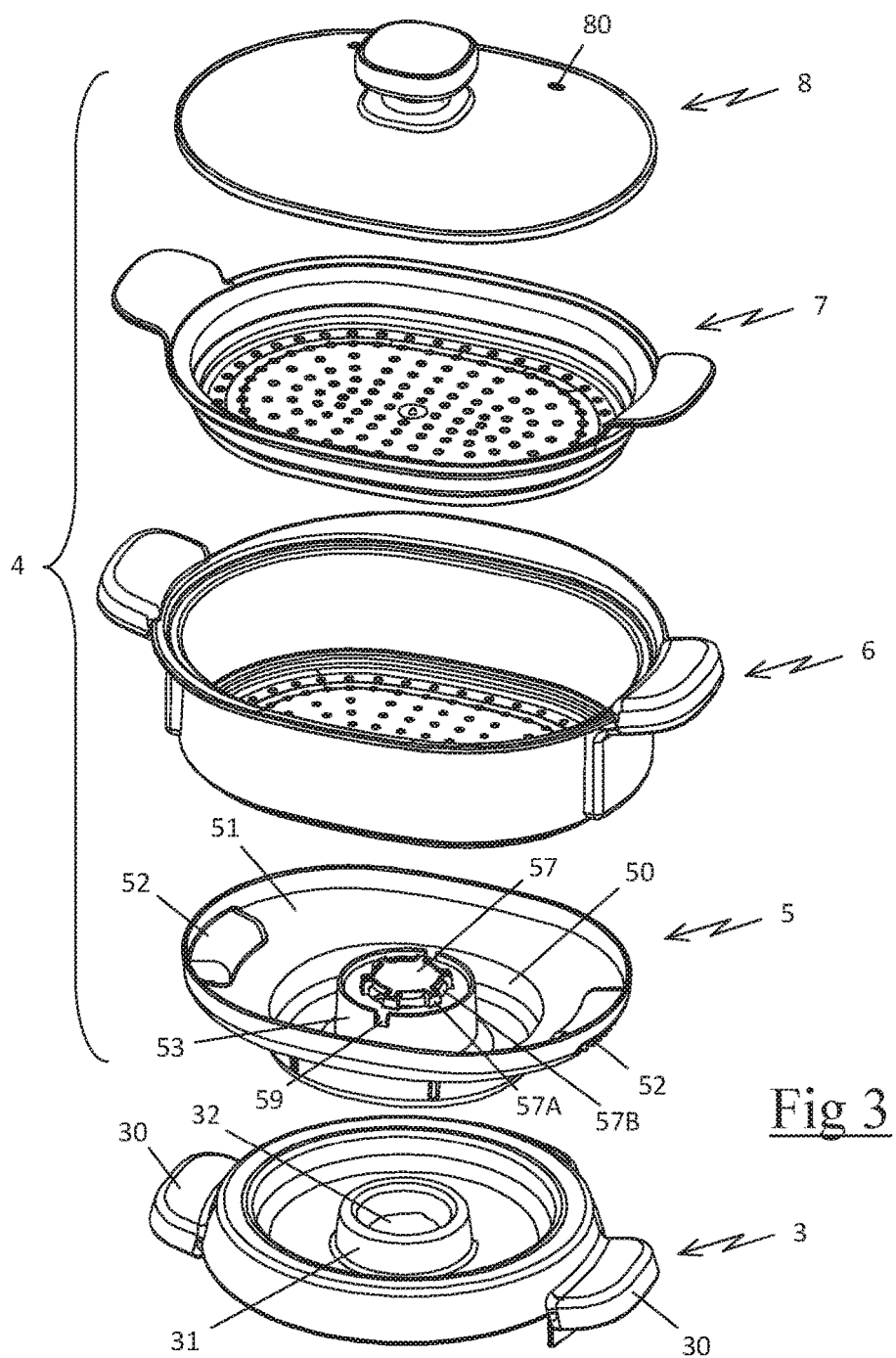
FIG. 3 is an exploded perspective view of the accessory assembled atop the lid of the mixing bowl of the appliance in FIG. 1.

As shown in FIGS. 2 and 3, the steaming accessory (4) comprises a receptacle (5) for collecting condensates, which can be rested directly on the lid (3) of the mixing bowl (2), a basket (6) for cooking food that can be rested on the receptacle (5), a cooking tray (7) designed to be rested on the basket (6) to provide a second cooking surface, and a closing lid (8), advantageously made of glass, which is rested on the tray (7) or directly on the basket (6).

As can be seen in FIGS. 4 through 8, the receptacle (5) is generally elongated in shape and comprises, at its center, a cavity (50) for collecting condensates that is bordered by a collecting wall (51) slanted in the direction of the cavity (50), the receptacle (5) having a gripping handle (52) at each of its longitudinal ends.

The cavity (50) comprises a bottom having, at its center, a protruding shaft (53), advantageously having an interior diameter on the order of 8 cm, into which the ring (31) of the lid (3) is inserted when the receptacle (5) is resting on the lid (3).

Preferably, the external diameter of the ring (31) of the lid (3) is slightly smaller than the interior diameter of the shaft (53), such that the ring (31) of the lid (3) is inserted inside the shaft (53), ensuring that the receptacle (5) is centered on the lid (3).

The shaft (53) has a cylindrical wall (54) with a circular cross-section, which extends roughly vertically from the bottom of the cavity (50) to a height on the order of 4 cm, and that comprises an upper end at the level of which an annular wall (55) extends crosswise, to partially close the upper end of the shaft (53), the annular wall (55) extending from the cylindrical wall (54) to the interior of the shaft (53) and having a central orifice (56), advantageously with a diameter on the order of 5 cm, allowing steam to pass through.

Figure 4:
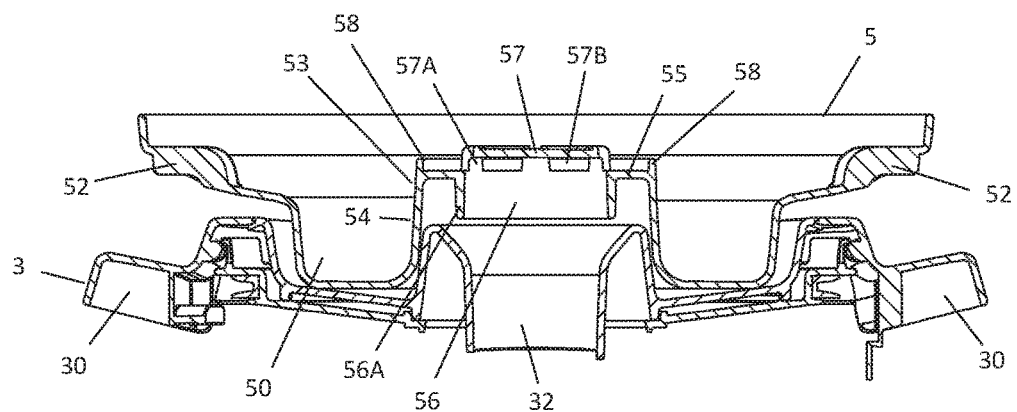
FIG. 4 is a longitudinal cross-section view of the lid of the mixing bowl of the appliance in FIG. 1, on top of which is assembled the accessory's receptacle for collecting condensates.
Figure 6:
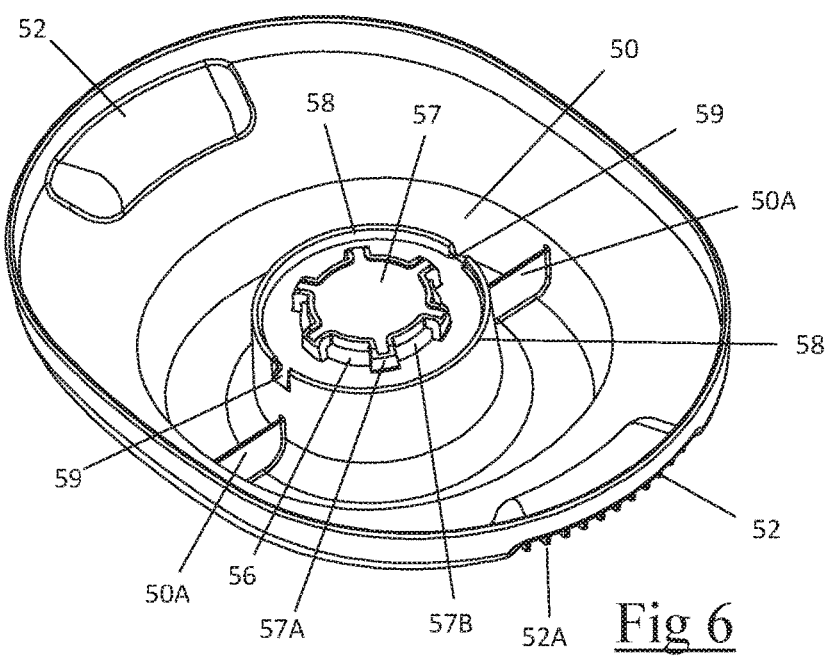
FIGS. 6 and 7 are perspective views of the receptacle for collecting condensates, depicted alone.

As shown in FIGS. 4 and 6, the shaft (53) has a guard (57) extending over the central orifice (56), the guard (57) being connected to the annular wall (55) by six feet (57A) distributed regularly along the perimeter of the central orifice (56), the feet (57A) being on the order of 5 mm tall and having, between them, radial openings (57B) for steam to pass through.

Preferably, the shaft (53) comprises, around the perimeter of the central orifice (56), a tubular wall (56A) extending axially to the central orifice (56), to the interior of the shaft (53), at a height on the order of 15 mm, the internal tubular wall (56A) having the same diameter as the central orifice (56) and having a lower end that aligns with the central opening (32) of the lid (3).

Figure 8:
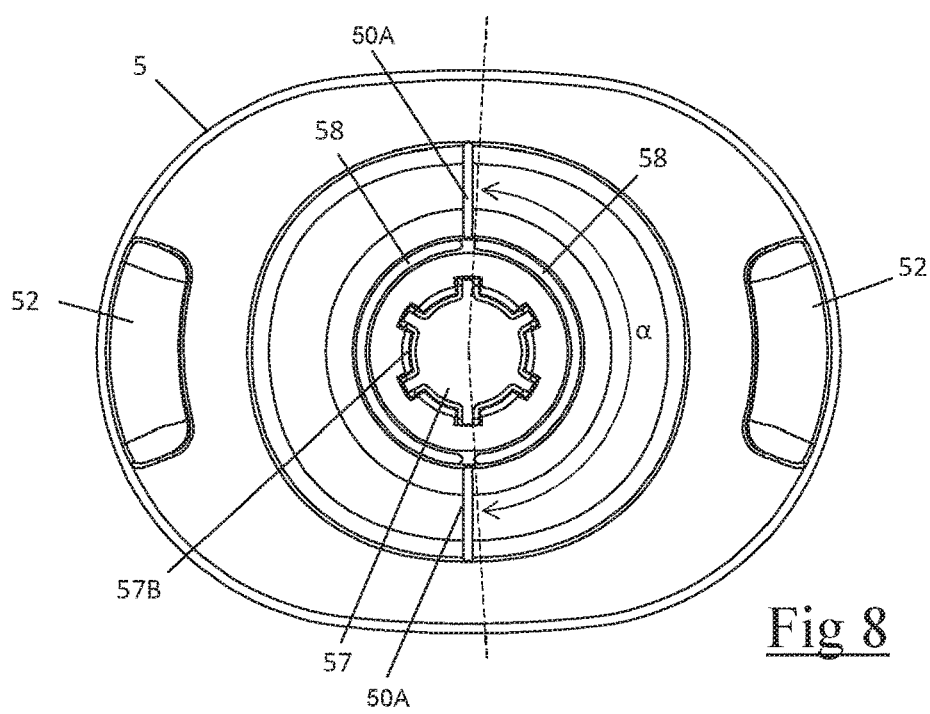
FIG. 8 is a view from above of the receptacle for collecting condensates.

As can be seen in FIG. 6, the shaft (53) comprises, facing each gripping handle (52), a full deflecting wall (58), standing vertically at a height on the order of 5 mm from the edge of the annular wall (55), both deflecting walls (58) extending over an angular sector a of at least 130° to slightly less than 180° such that, between the ends of the deflecting walls (58), there is a resulting passageway (59) that is on the order of 7 mm wide, see also FIG. 8.

Advantageously, the receptacle (5) also has two flat separating partitions (50A) that extend across the cavity (50), on either side of the shaft (53), both separating partitions (50A) extending perpendicular to the longitudinal axis of the receptacle (5) and vertically from the bottom of the cavity (50) to a height on the order of 2 cm.

Figure 7:
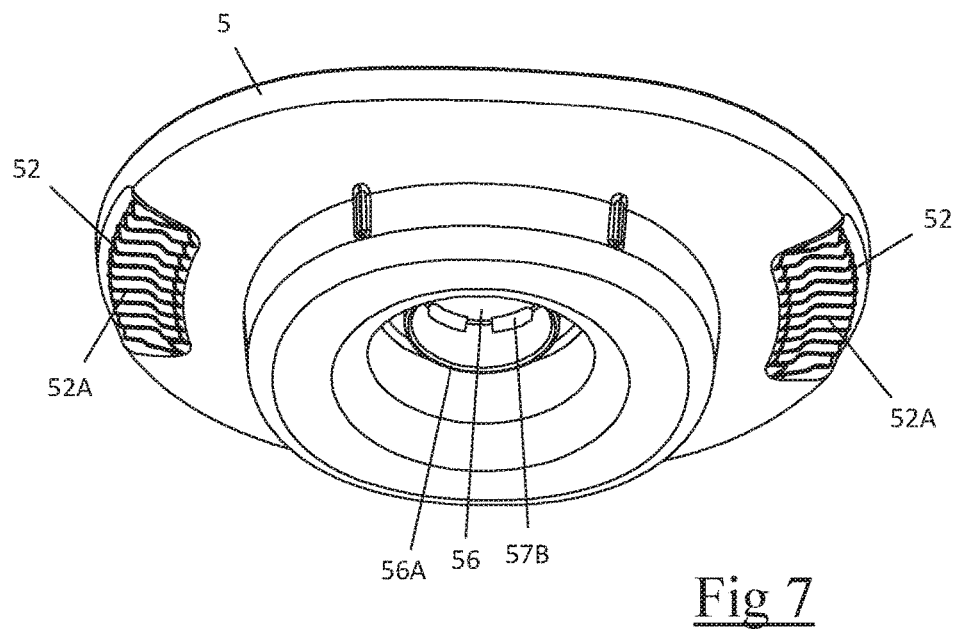

As shown in FIG. 7, the receptacle (5) advantageously comprises, at the level of the gripping handles (52), multiple raised ribs (52A) that protrude on the lower surface of the gripping handle (52) and that are separated from one another by a layer of air.

The operation of the appliance will now be described.

When the user wishes to steam food using the appliance, he puts some water, or a liquid preparation, in the mixing bowl (2) of the appliance, and then he positions the lid (3) on the mixing bowl (2) of the appliance. The accessory (4) is then placed on the lid (3), as illustrated in FIG. 1, such that the shaft (53) of the receptacle (5) is engaged around the ring (31), the internal tubular wall (56A) of the receptacle (5) thus being aligned with the central opening (32) of the lid (3).

The user can then place the first foods to be cooked in the basket (6) and, as necessary, use the tray (7) to cook other foods in the upper part of the basket (6), without the latter foods being in contact with the first foods. Once the basket (6) and/or the tray (7) is closed by means of the closing lid (8), the user selects a steaming program on the appliance.

Figure 5:
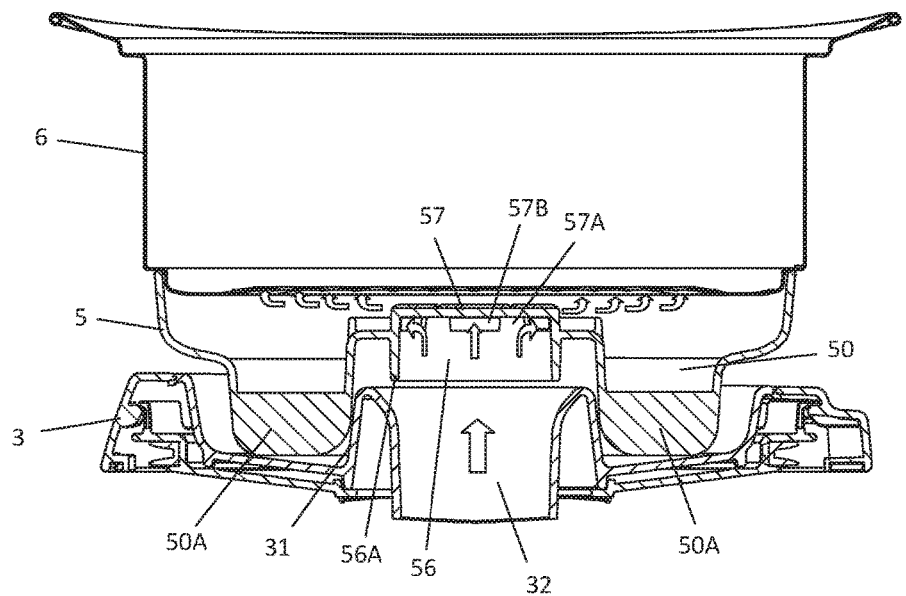
FIG. 5 is a crosswise cross-section view of the lid of the mixing bowl of the appliance in FIG. 1, on top of which is assembled the accessory's receptacle and cooking basket.

The steam produced in the mixing bowl (2) then escapes through the opening (32) in the lid (3), and then through the tubular wall (56A) before being diverted by the guard (57) to be diffused through the radial openings (57B) of the shaft (53), in the direction of flow indicated by the arrows in FIG. 5. The steam is then evenly distributed over the lower surface of the basket (6), and then through holes arranged in the bottom of the tray (7), before escaping through two openings (80) arranged in the closing lid (8).

During cooking, gravity causes the condensates forming in contact with the cold walls of the basket (6) to flow into the cavity (50), thus preventing them from returning to the mixing bowl (2) and from polluting any food being prepared.

Once steaming is complete, the entire accessory (4) can be lifted off by grabbing the gripping handles (52) in order to bring the accessory (4) to a sink, the ribs (52A) present beneath the gripping handles (52) acting as cooling fins and offering the advantage of significantly lowering the temperature in the area that comes into contact with the hand, thereby preventing any burn risk.

When the user moves the accessory (4), the liquid present in the cavity (50) naturally tends to move from one longitudinal end of the receptacle (5) to the other; however, such movement of the liquid is impeded by the presence of separating partitions (50A) that act as a barrier hindering the movement of the liquid.

When there is a significant amount of liquid present in the cavity (50), a portion of the liquid nevertheless moves longitudinally, forming a wave that hits the shaft (53) on its sides facing the gripping handles (52), or in other words, at the place where the shaft (53) has deflecting walls (58). The deflecting walls (58), which stand above the level of the annular wall (55), then act as barriers hindering the movement of the liquid in the direction of the central orifice (56) of the shaft (53).

If some liquid still manages to spill over the deflecting wall (58), the passageways (59) arranged between the two deflecting walls (58) and oriented crosswise to the longitudinal axis of the receptacle (5), allow the liquid present on the annular wall (55) and running along the deflecting wall (58) to pour into the cavity (50), thereby reducing the risk that said liquid will run through the central orifice (56) of the shaft (53).

The accessory (4) thus created therefore offers the advantage of improving the usage ergonomics of the appliance, by significantly limiting the burn risk for the user while handling the receptacle for collecting condensates when cooking is complete, whether through contact with the gripping handles of the receptacle or due to the condensates spilling onto the user through the central orifice of the shaft.

Of course, the invention is in no way limited to the method of implementation described and depicted, which has been provided only as an example. Modifications remain possible, particularly with respect to the makeup of the various components or by substituting equivalent techniques, while still remaining within the scope of protection of the invention.

Thus, in one variation of implementation not depicted, the deflecting walls may extend only over a smaller angular sector than the one illustrated in the figures, along the perimeter of the shaft.

Thus, in another variation of implementation not depicted, the two deflecting walls may meet up to form only one deflecting wall that runs around the entire perimeter of the shaft, and said deflecting wall may comprise, over at least one of its sides oriented crosswise to the gripping handles, an opening that is flush with the upper surface of the annular wall, to form a passageway allowing liquid to flow through.

Thus, in another variation of implementation, the receptacle may not have a separating partition in the bottom of the cavity and have only deflecting walls at the top of the shaft, as such a variation offers the advantage of being less costly to produce, while remaining effective.

The invention claimed is:

1. A steaming accessory comprising a receptacle for collecting condensates designed to rest on a mixing bowl of a household appliance, comprising a means of heating the contents of the mixing bowl, the receptacle having a cavity for collecting condensates and two gripping handles arranged symmetrically on either side of the cavity, said cavity having a bottom comprising a protruding shaft equipped with a central orifice allowing steam to pass through, said accessory also having at least one basket for cooking food that is positioned on said receptacle, wherein the shaft comprises, near its upper end, an annular wall extending around the central orifice and crosswise to the shaft, and wherein the shaft comprises, facing each gripping handle, a deflecting wall standing taller than the level of the annular wall, wherein the shaft protrudes up from the bottom of the cavity of the receptacle, and wherein the protruding shaft is formed in part from a cylindrical wall that is an extension of the bottom wall of the receptacle.

2. The steaming accessory described in claim 1, wherein the shaft comprises a guard that covers the central orifice at least partially, said guard being supported by feet having radial openings between them to allow steam to pass through.

3. The steaming accessory described in claim 1, wherein said deflecting wall extends along a perimeter of the shaft over an angular sector a of at least 130°.

4. The steaming accessory described in claim 1, wherein said deflecting wall is arranged in a vertical extension of a cylindrical wall.

5. The steaming accessory described in claim 1, wherein the deflecting wall extends beyond an upper surface of the annular wall by at least 3 mm to about 5 mm.

6. The steaming accessory described in claim 5, wherein there is, between the deflecting walls, at least one passageway allowing water present on the upper surface of the annular wall to drain into the cavity.

7. The steaming accessory described in claim 6, wherein the shaft has two passageways arranged symmetrically between the deflecting walls.

8. The steaming accessory described in claim 1, wherein the receptacle has at least one separating partition that extends crosswise in the cavity to block liquid from moving inside the cavity.

9. The steaming accessory described in claim 1, wherein the gripping handles of the receptacle have a lower surface comprising a series of raised ribs, separated from one another by a thin layer of air.

10. A cooking appliance comprising a mixing bowl receiving a working tool spun by a motor and having a heating mechanism to heat the contents of the mixing bowl, further comprising an accessory comprising a receptacle for collecting condensates designed to rest on the mixing bowl of the cooking appliance, comprising a means of heating the contents of the mixing bowl, the receptacle having a cavity for collecting condensates and two gripping handles arranged symmetrically on either side of the cavity, said cavity having a bottom comprising a protruding shaft equipped with a central orifice allowing steam to pass through, said accessory also having at least one basket for cooking food that is positioned on said receptacle, wherein the shaft comprises, near its upper end, an annular wall extending around the central orifice and crosswise to the shaft, and wherein the shaft comprises, facing each gripping handle, a deflecting wall standing taller than the level of the annular wall, wherein the shaft protrudes up from the bottom of the cavity of the receptacle, and wherein the protruding shaft is formed in part from a cylindrical wall that is an extension of the bottom wall of the receptacle.

* * * * *

UNITED STATES PATENT AND TRADEMARK OFFICE
CERTIFICATE OF CORRECTION

PATENT NO. : 10,470,609 B2
APPLICATION NO. : 15/140859
DATED : November 12, 2019
INVENTOR(S) : Emmanuel Gerard et al.

Page 1 of 1

It is certified that error appears in the above-identified patent and that said Letters Patent is hereby corrected as shown below:

On the Title Page

Item (57), Column 2, Line 8, ABSTRACT, delete "through" and insert -- through, --

In the Claims

Column 7, Line 3, Claim 3, delete "a" and insert -- α --

Signed and Sealed this
Thirty-first Day of March, 2020

Andrei Iancu
*Director of the United States Patent and Trademark Office*